United States Patent [19]
Reinecke

[11] 3,928,802
[45] Dec. 23, 1975

[54] AXLE GENERATOR DEVICE HAVING DEFLECTABLE STATOR

[75] Inventor: Erich Reinecke, Beinhorn, Germany

[73] Assignee: WABCO Westinghouse GmbH, Hannover, Germany

[22] Filed: May 24, 1974

[21] Appl. No.: 473,140

[30] Foreign Application Priority Data
Aug. 10, 1973    Germany............................ 2340585

[52] U.S. Cl................................. 324/174; 310/168
[51] Int. Cl.²...................... G01P 3/48; H02K 19/24
[58] Field of Search...................... 324/174; 310/168

[56] References Cited
UNITED STATES PATENTS

| | | |
|---|---|---|
| 3,564,313 | 2/1971 | Goor................................... 310/168 |
| 3,745,392 | 7/1973 | Phoenix et al...................... 310/168 |
| 3,769,534 | 10/1973 | Wroblewski et al................ 310/168 |

*Primary Examiner*—Alfred E. Smith
*Assistant Examiner*—R. Hille
*Attorney, Agent, or Firm*—R. W. McIntire, Jr.

[57] ABSTRACT

An axle generator device the rotor of which rotates in a plane passing through the magnetic flux path of a stator having a coil with a permanent magnet core that is yieldably biased against a positive stop defining the magnetic air gap between the rotor and stator, and is further arranged to provide axial and radial deflection of the stator against the yieldable bias in the event the rotor becomes cocked or otherwise misaligned during wheel/axle assembly or disassembly, thereby providing protection of the stator against damage and ultimate generation of inaccurate speed signals.

3 Claims, 1 Drawing Figure

U.S. Patent  Dec. 23, 1975  3,928,802
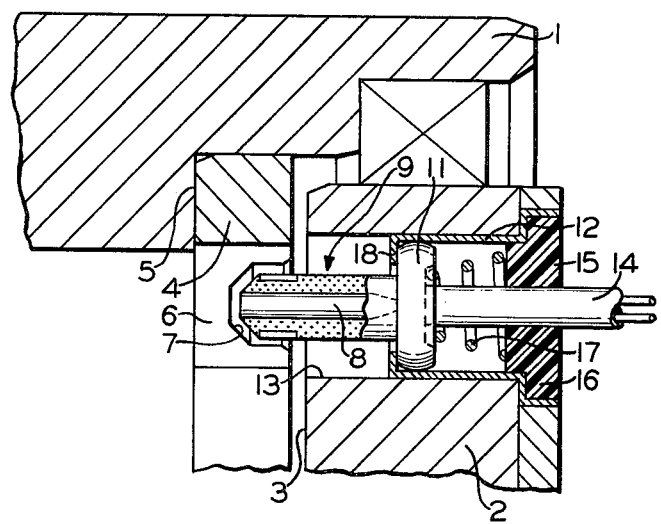

AXLE GENERATOR DEVICE HAVING DEFLECTABLE STATOR

BACKGROUND OF THE INVENTION

The present invention relates to axle generator type tachometers for use in automotive antiskid brake control systems.

Such tachometers are comprised of a rotor having ferro-magnetic teeth uniformly spaced circumferentially about the rotor, which is mounted to rotate with the wheel, and a stator mounted on the axle housing that is made up of a magnetic core having an electrical coil wound upon it. The stator is positioned so that rotation of the rotor with the wheel results in the rotor teeth passing in close proximity with the magnetic core of the stator to provide a good flux path through which the magnetic energy passes. This flux path is intermittently degraded as each space between the rotor teeth passes the magnetic core. The resulting alterations in the magnetic flux generate electrical pulses in the coil having a frequency that varies with the speed of rotation of the wheel.

Since the amplitude of the generated electrical pulses depends upon the rate of flux change, very low wheel speeds are difficult to detect. Accordingly, very close tolerances are required to maintain the magnetic air gap dimension between the rotor and stator as constant as possible for precise pulse definition at low wheel speeds in order to optimize the accuracy of the speed signal generated by the tachometer, thus making the tachometer relatively costly.

This high cost involved in maintaining close manufacturing tolerances can be alleviated somewhat by providing the rotor teeth with a groove into which the magnetic core of the stator can project. Such an arrangement tends to counteract changes in the flux intensity with radial variations in the magnetic air gap, thereby accommodating manufacturing tolerances of greater latitude without experiencing signal degradation.

In assembling and disassembling the wheel and axle housing, however, there is the danger of misalignment occurring between the stator and rotor that is capable of causing damage to the axle generator, whether employing the solid rotor teeth or the grooved teeth. Damage may be of such extent as to create disturbances in the wheel speed signal to the point where an accurate speed signal cannot be obtained, thus jeopardizing the operational integrity of the antiskid brake control system.

SUMMARY OF THE INVENTION

The object of the present invention therefore is to provide a tachometer generator of the above type whose stator portion is so arranged as to absorb damaging forces when engaged by the teeth of the rotor when misalignment occurs therebetween in order to prevent damage to either the rotor or stator parts.

It is another object of the invention to arrange the rotor so as to automatically assume a preset position that establishes the desired magnetic air gap any time the rotor and stator are properly aligned.

These objects are fulfilled, according to the present invention, by mounting the stator core within the coil so as to be movable in either a radial or axial direction away from a stationary stop member against which a spherical flange of the stator is normally urged in the direction of the rotor by a spring acting between the spherical flange and an end cover that clamps the stop member in place.

Such an arrangement allows the stator to give way under the effect of small as well as larger forces when engaged by the rotor due to a radial displacement between the wheel and axle. When mounted concentrically or when completely disassembled, the sprung stator core is automatically restored to its normal position against its stop member to reestablish the magnetic air gap without any readjustment whatsoever.

The advantage of the present invention, therefore, lies in the fact that costly arresting devices for positioning the stator core within a predetermined distance of the rotor to obtain the desired air gap become unnecessary. Moreover, the time consuming adjustment of the air gap after each assembly of a wheel and axle is eliminated, the only requirement being the initial air gap adjustment made in accordance with selection of the stop member having the proper dimension.

Other objects and advantages of the invention will become apparent as the description proceeds with reference to the accompanying single figure drawing.

DESCRIPTION AND OPERATION

In the drawing, a hub 1 of the wheel is provided with a bearing which allows the wheel to rotate freely on an axle 2 in the usual manner. Mounted on wheel hub 1 against a shoulder 5 thereof is a rotor 4 having evenly spaced gear teeth 6 that extend in the direction of front face 3 of axle housing 2. Formed in each tooth 6 is a groove 7 into which projects a core 8 consisting of a partly wound permanent magnet forming a stator 9 that includes a cylindrical flange 11. The outer periphery of flange 11 is spherical in shape so as to be rockably carried in a bushing 12 of a bore 13 in axle housing 2. An electrical conduit 14 containing the lead wires of the winding of the core 8 passes through an opening in an end cover 15 of bore 13. A flange 16 of end cover 15 embraces one end of bushing 12 to clamp the bushing in place against the back face of axle housing 2. A conical spring 17 acts between end cover 15 and flange 11 in order to maintain constant pressure on flange 11 in the direction of a stop 18 formed by an inturned flange at the end of bushing 12 opposite the end clamped by end cover 15.

In order to prevent damage to the wheel generator described when reassembling wheel 1 on axle housing 2 or upon initial assembly thereof, such that one of the teeth 6 is misaligned with core 8, the stator 9 including core 8 and flange 11 will be moved in a direction away from stop 18 of bushing 12 against spring 17 as the wheel is slid into place. If in sliding the wheel in place, some canting should occur, the core 8 of stator 9 will give in a radial direction by pivoting slightly around the spherical surface of flange 11. It will be apparent therefore that nonrigid assembly of stator 9 thus accommodating misalignment with rotor 4 to prevent damage during assembly of the wheel and axle.

Upon proper alignment of rotor 4 and stator 9 after the wheel assembly is completed, groove 7 will become aligned with core 8, thereby allowing spring 17 to restore the stator to its predetermined position, with flange 11 resting against stop 18, which automatically restores the air gap to its proper dimension.

Having now described the invention what I claim as new and desire to secure by Letters Patent, is:

1. A speed signal generator device for providing output pulses corresponding in frequency to the angular velocity of a rotating member comprising:
   a. a stator mounted on the axle of the rotating member and having a magnetic flux field;
   b. a rotor mounted on the rotating member for movement in a plane passing through the magnetic flux field and having a plurality of uniformly spaced teeth to intermittently alter the path of the magnetic field flux;
   c. a bore in the axle of the rotating member having an axis substantially aligned opposite the line of rotation of the teeth of said rotor;
   d. a bushing in said bore having an inturned flange at one end;
   e. said stator including:
      i. a permanent magnet core for providing said magnetic flux, said core having one end adjacent said rotor and the other end terminating in a guide member that is operatively confined within said bushing for axial movement in said bore; and
      ii. an electric coil on said magnetic core for generating output pulses with successive alterations in said magnetic flux field; and
   f. elastic means for yieldably urging the other end of said core into engagement with the inturned flange of said bushing to establish the position of the one end of said core a predetermined distance from the teeth of said rotor during rotation thereof when said rotating member is properly assembled on its axle.

2. A speed signal generator device as recited in claim 1, further characterized in that the surface of the guide member is spherical to provide for universal pivotal movement of said core about said guide member whereby said one end of said core is deflectable in a substantially radial direction.

3. A speed signal generator device as recited in claim 1, further characterized in that the teeth of said rotor are each provided with a groove into which said core projects.

* * * * *